United States Patent
Maria et al.

(10) Patent No.: US 9,642,078 B2
(45) Date of Patent: May 2, 2017

(54) DEVICES, METHODS, AND COMPUTER READABLE STORAGE DEVICES FOR PROVIDING APPLICATION SERVICES

(71) Applicant: AT&T Mobility II LLC, Atlanta, GA (US)

(72) Inventors: Arturo Maria, Bellevue, WA (US); Thomas J. Routt, Edmonds, WA (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

(21) Appl. No.: 14/063,483

(22) Filed: Oct. 25, 2013

(65) Prior Publication Data

US 2015/0119033 A1    Apr. 30, 2015

(51) Int. Cl.
H04W 4/00 (2009.01)
H04W 48/18 (2009.01)
H04W 88/16 (2009.01)

(52) U.S. Cl.
CPC ............ H04W 48/18 (2013.01); H04W 88/16 (2013.01)

(58) Field of Classification Search
CPC .................................................. H04W 48/18
See application file for complete search history.

(56) References Cited

U.S. PATENT DOCUMENTS

| | | | |
|---|---|---|---|
| 7,088,995 B2 | 8/2006 | Rao | |
| 8,218,568 B2 | 7/2012 | Keidar et al. | |
| 8,391,886 B1* | 3/2013 | Thaper | H04M 3/42348 455/414.1 |
| 8,472,919 B1* | 6/2013 | Sivalingham | H04W 12/06 455/410 |
| 2005/0141706 A1* | 6/2005 | Regli | H04L 9/0836 380/44 |
| 2007/0060171 A1* | 3/2007 | Sudit | H04W 8/245 455/456.1 |
| 2007/0238448 A1* | 10/2007 | Gallagher | H04W 4/22 455/414.2 |
| 2008/0162637 A1 | 7/2008 | Adamczyk et al. | |
| 2010/0312646 A1* | 12/2010 | Gupta | G06Q 30/0261 705/14.58 |
| 2011/0090815 A1 | 4/2011 | Gundavelli et al. | |
| 2011/0131643 A1 | 6/2011 | Lawrence et al. | |
| 2011/0202730 A1* | 8/2011 | Sonoda | H04L 63/0815 711/141 |
| 2012/0295580 A1* | 11/2012 | Corner | H04W 12/12 455/405 |
| 2013/0036023 A1 | 2/2013 | Koplovitz et al. | |
| 2013/0095785 A1 | 4/2013 | Sadana et al. | |
| 2014/0362712 A1* | 12/2014 | Agarwal | H04W 28/0236 370/252 |

* cited by examiner

Primary Examiner — Idowu O Osifade
(74) Attorney, Agent, or Firm — Amin, Turocy & Watson, LLP

(57) ABSTRACT

Application services associated with a mobile communication device are facilitated by a mediator gateway. A request for providing an application service is received by the mediator gateway. The request is associated with a mobile communication device. The mediator gateway selects a network among a plurality of networks associated with different carriers to which to send the request. The request is translated into an application programming interface request that is specific to a carrier associated with the selected network. The application programming interface request is sent to an application programming interface gateway associated with the carrier that is associated with the selected network.

20 Claims, 4 Drawing Sheets

DEVICES, METHODS, AND COMPUTER READABLE STORAGE DEVICES FOR PROVIDING APPLICATION SERVICES

TECHNICAL FIELD

The present disclosure relates generally to communication and, more particularly to providing application services.

BACKGROUND

Over the last decade, cellular carriers have developed an increasing number of services to support mobile applications. For example, these services include, e.g., mobile presence services, location-based services, multimedia messaging service (MMS), short message service (SMS) messaging, etc. These services have traditionally been accessed by very well-defined carrier-supported services.

In the last few years, enterprises have implemented various methods for developing and deploying mobile applications. In order to facilitate the development and implementation of mobile applications and communication with enterprises to provide access to these services by enterprises, carriers have implemented specialized gateways with Application Programming Interfaces (APIs) that provide a front-end to these services. These gateways, which are referred to as carrier API gateways, allow enterprises to issue requests using high-level languages and parameters (HLLAPIs) and low-level language procedural calls (LLAPIs). Once requests from enterprises are received by the carrier API gateways, the carrier API gateways then issue complex and secure commands for various carrier-based services, such as presence services, location services, multimedia messaging service (MMS), short message service (SMS), etc. This information is then relayed back to the requesting enterprise using high-level APIs or low-level APIs. The benefit of this approach is that enterprises supporting mobile applications only have to interface with one API gateway for each carrier, as opposed to making multiple calls for location services, presence services, MMS, SMS, and other carrier services.

While carrier API gateways simplify the interface to enterprises for providing application services to mobile communication devices, the reality is that enterprises are seldom, if ever, served by a single carrier. Most enterprises utilize at least two carriers and often have three or four carriers supporting their mobile applications.

Currently, enterprise servers have to interface with a different carrier API gateway for each carrier with which they contract, resulting in a requirement to interface through a plurality of carrier API gateways for a plurality of contracted carriers. This may be understood with reference to FIG. 1.

Referring to FIG. 1, an enterprise web and application server 110 (referred to hereafter as an "enterprise server") interfaces with carrier 1 API Gateway 120A for providing application services for mobile communication devices 140A and 140B associated with carrier 1 networks 130A. Similarly, the enterprise server 110 interfaces with carrier 2 API Gateway 120B for application services for mobile communication devices 140C and 140D associated with carrier 2 networks 130B. The enterprise server 110 communicates with the carrier API gateways 120A and 120B via a communication network 115, such as the Internet. The carrier API gateway 120A is dedicated to carrier 1, and the carrier API gateway 120B is dedicated to carrier 2.

Requests from and responses to the enterprise server 110 that are associated with carrier 1 are communicated via the Internet 115, the carrier 1 API gateway 120A and the carrier 1 networks 130A. Similarly, requests from and responses to the enterprise server 110 that are associated with carrier 2 are communicated via the Internet 115, the carrier 2 API gateway 120B and the carrier 2 networks 130B.

Carrier 1 API gateway 120A and the carrier 2 API gateway 120B typically have inconsistent communication protocols. Thus, the enterprise server 110 must issue requests and interpret responses differently for each carrier API gateway.

As the number of application services grows, interfacing with different carrier API gateways becomes cumbersome and inefficient. Furthermore, if any given carrier has not implemented an API gateway, the enterprise server 110 must then interface directly, in a rudimentary fashion, with a plurality of single-threaded services for smaller carriers.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a device is provided for providing an application service. The device includes a processor and a memory having stored thereon instructions which, when executed by the processor, cause the processor to perform operations. The operations include receiving a request for providing an application service. The request is associated with a mobile communication device. The operations also include selecting a network among a plurality of networks associated with different carriers to which to send the request, translating the request into an application programming interface request that is specific to a carrier associated with the selected network, and sending the application programming interface request to an application programming interface gateway associated with the carrier that is associated with the selected network.

According to another illustrative embodiment, a method is provided for providing application services. The method includes receiving, by a mediator gateway, a request for providing an application service. The request is associated with a mobile communication device. The method further includes selecting a network among a plurality of networks associated with different carriers to which to send the request, translating the request into an application programming interface request that is specific to a carrier associated with the selected network, and sending the application programming interface request to an application programming interface gateway associated with the carrier that is associated with the selected network.

According to another illustrative embodiment, a computer readable storage device is provided that has instruction stored thereon which, when executed by a processor, cause the processor to perform operations for providing application services. The operations include receiving a request for providing an application service. The request is associated with a mobile communication device. The operations also include selecting a network among a plurality of networks associated with different carriers to which to send the request, translating the request into an application programming interface request that is specific to a carrier associated with the selected network, and sending the application programming interface request to an application programming interface gateway associated with the carrier that is associated with the selected network.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to an illustrative embodiment, a mediator for API gateways, referred to hereafter as a "mediator gateway" is provided. The mediator gateway communicates with a plurality of enterprise servers using a single, MetaAPI interprogram logical interface.

The mediator gateway employs a single, enterprise- and carrier-independent interprogram protocol boundary and set of interprogram requests, replies, data calls, and administrative calls. The mediator gateway translates requests from the enterprise servers into a plurality of carrier-specific API requests, replies, data calls, and administrative calls. The mediator gateway provides the enterprise servers with a single interface to a plurality of carrier-specific API gateways. The mediator gateway is a stateful machine that can simulate a plurality of carrier networks.

Figure 1:
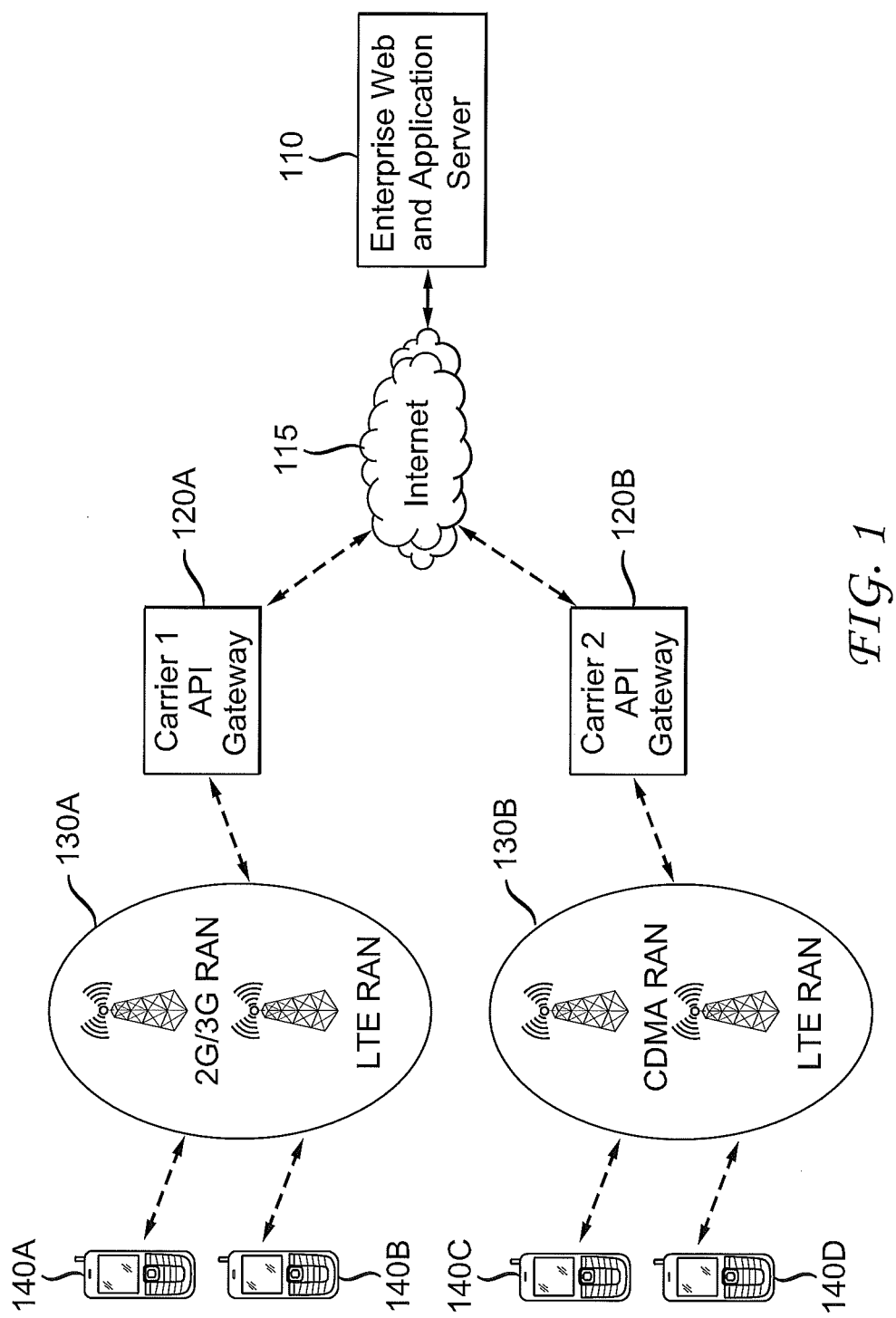
FIG. 1 illustrates a conventional API gateway environment.
Figure 2:
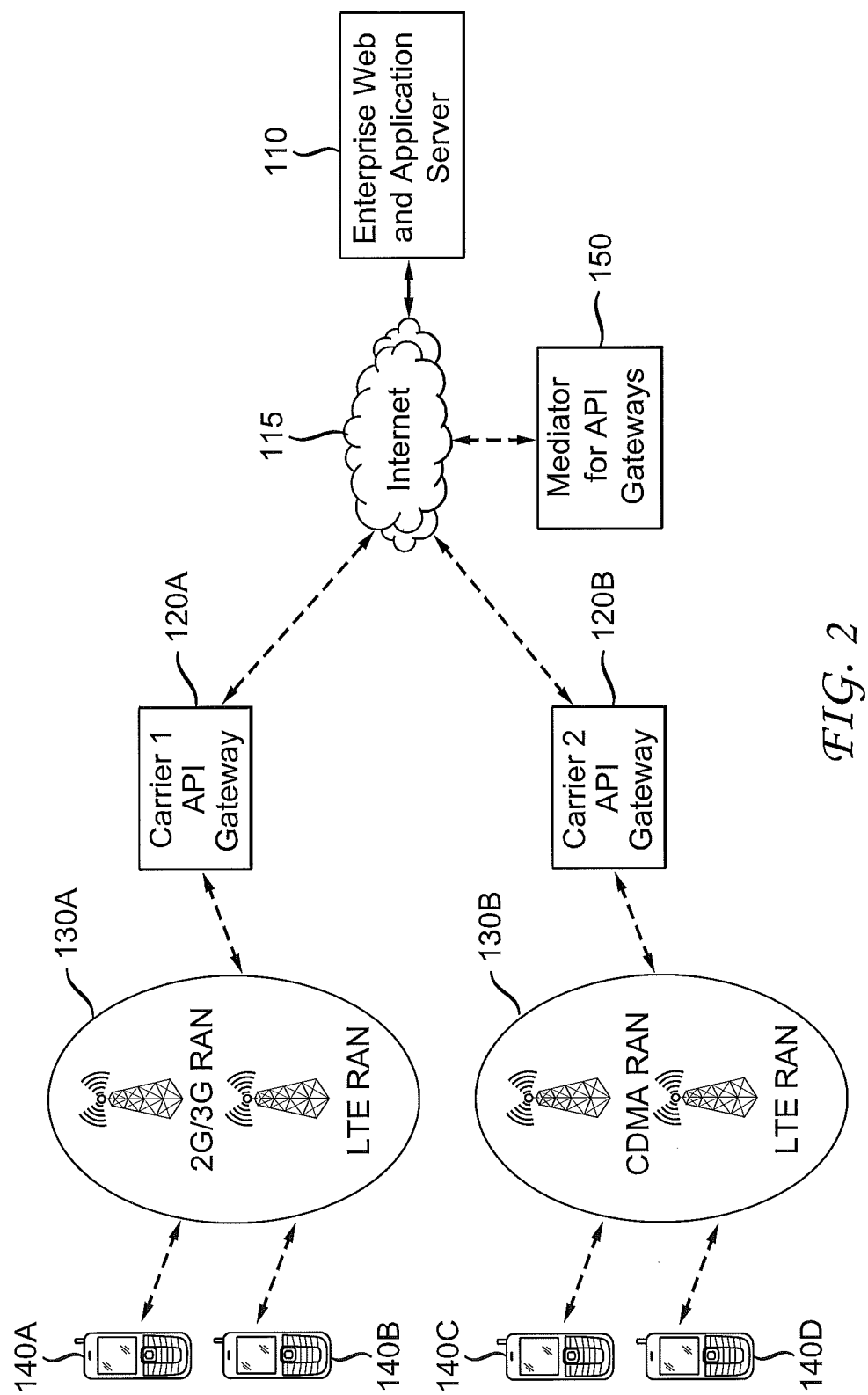
FIG. 2 illustrates an environment in which a mediator gateway may be implemented according to an illustrative embodiment.

Illustrative embodiments may be understood with reference to FIG. 2 which illustrates an environment in which a mediator gateway may be implemented. Referring to FIG. 2, a mediator gateway 150 resides outside of the carrier networks 130A and 130B and functions in a domain placed between the carrier API gateways 120A and 120B and the enterprise server 110. According to illustrative embodiments, the mediator gateway 150 communicates with the enterprise server 110 via a communication network, such as the Internet 115. The mediator gateway 150 also communicates with the carrier API gateways 120A and 120B via a communication network, such as the Internet 115. Alternatively, the mediator gateway 150 may communicate with the carrier API gateways 120A and 120B over carrier-dedicated multiprotocol label switching (MPLS) connection (not illustrated).

Figure 3:
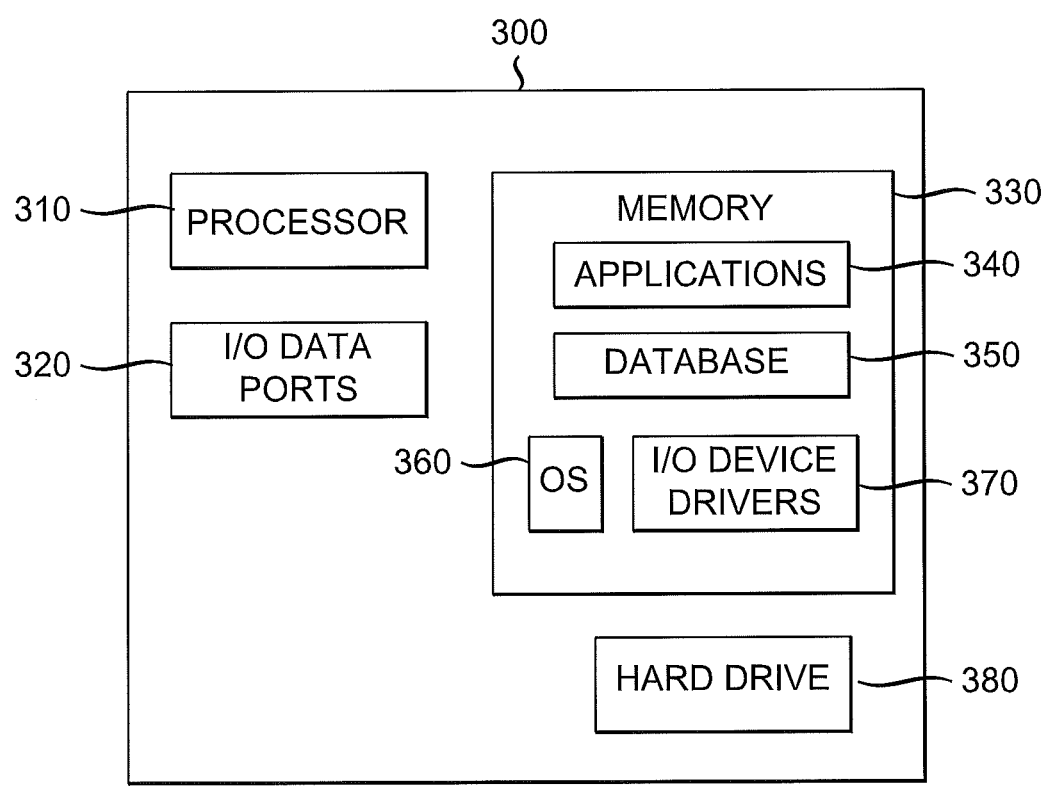
FIG. 3 illustrates a block diagram of a computing device with which a mediator gateway may be implemented according to illustrative embodiments.

The mediator gateway 150 may be implemented with a computing device, such as that shown in FIG. 3. The enterprise server 110 and carrier API gateways 120A and 120B may be implemented with computing devices similar to that shown in FIG. 3. The mobile communication devices may be implemented with any communication device that is provided with application services, e.g., smartphones, laptops, tablets, etc.

Although one mediator gateway 150 is shown for simplicity of illustration, it should be appreciated that there may be any number of distributed mediator gateways. Also, although only one enterprise server 110 is shown for simplicity of illustration, it should be appreciated that any number of enterprise servers may communicate with the carrier API gateways 120A and 120B via the mediator gateway 150. Similarly, it should be appreciated that any number of carrier networks with respective carrier API gateways may be used, and any number of mobile communication devices may be provided with application services.

Further, although the carrier 1 networks 130A are illustrated as including a 2G/3G Radio Access Network (RAN) and a Long Term Evolution (LTE) RAN, and the carrier 2 networks 130B are illustrated as including a Code Division Multiple Access (CDMA) RAN and an LTE RAN, it should be appreciated that this is by way of example. The carrier networks 130A and 130B may be implemented with any suitable cellular network or combination of cellular networks. Such cellular networks may operate according a protocol dictated by telecommunications standards, such as Global System for Mobile communications (GSM) and a Universal Mobile Telecommunications System (UMTS). It should be understood, however, that the networks 130A and 130B may also be implemented using wireless networks that use any existing or yet to be developed telecommunications technology. For example, some other suitable cellular telecommunications technologies include, but are not limited to, Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers. In addition, other types networks may be used, e.g., Wireless LAN (WLAN), either alone or in combination with the cellular networks. Further, although not shown for simplicity of illustration, it should be appreciated that the carrier networks 130A and 130B include servers and other components for providing carrier various services, such as location services, presence services, emergency services, MMS, SMS, etc.

According to illustrative embodiments, the mediator gateway 150 maintains a database storing information about the mobile communication devices 140A, 140B, 140C and 140D. The database keeps track of the locations of the mobile communication devices 140A, 140B, 140C 140D, events associated with the mobile communication devices, e.g., purchases, carriers that are serving the mobile communication devices etc. The mediator gateway 150 also maintains a database that keeps track of the status of the carrier networks 130A and 130B. Also, the mediator gateway 150 contains a catalog or database of all APIs.

According to an illustrative embodiment, when the mediator gateway 150 receives a request from the enterprise server 110 for providing an application service associated with a mobile communication device, the mediator gateway 150 determines a carrier that provides service to that mobile communication device, e.g., based on information stored by the mediator gateway 150 or based on information specified within the received request. The mediator gateway 150 then translates the request from the enterprise server 110 into an API request that is specific to the carrier that serves the mobile communication device with which the request is associated. The mediator gateway 150 sends the translated carrier-specific API request to the carrier API gateway associated with the carrier that serves the mobile communication device associated with the request.

In addition to determining the carrier that serves the mobile communication device associated with the request from the enterprise 110, the mediator gateway 150 selects a network operated by that carrier to use based on the request. For this purpose, the mediator gateway 150 consults a database, e.g., the database 350 shown in FIG. 3 that maintains carrier network status and determines which network operated by the carrier will provide the best performance, e.g., the best quality of service, for fulfilling the request.

When the API request is fulfilled, an API response may be sent back to the carrier API gateway and then to the mediator gateway 150. The mediator gateway 150, in turn, may translate the API response to a response that is not specific to the carrier and then relay the response to the enterprise server 110 via the Internet 115. As an alternative, the API response may be delivered directly from the carrier API gateway to the enterprise server 110 via the Internet 115, bypassing the mediator gateway 150. The decision as to whether or not the API response is sent to the mediator gateway 150 or directly to the enterprise server 110 may be made in advance by the mediator gateway 150 based on predefined rules or at the time of the request based on current carrier network availability, quality of service metrics, and/or parameters included within the request. For example, the request may include security parameters that indicate whether the response should be sent to the mediator gateway 150. The best network route may also be taken into consideration in determining whether the response should be sent directly to the enterprise server 110. For example, if there is congestion between a carrier API gateway and the mediator gateway 150, then the response may bypass the mediator gateway 150. In some cases, the request from the enterprise server 110 may dictate that the response be delivered directly to the enterprise server 110.

To understand the flow of requests and responses via the mediator gateway 150, consider a scenario in which the enterprise server 110 sends a query for a location of the mobile communication device 140A to the mediator gateway 150. The mediator gateway 150 determines that the request is associated with the mobile communication device 140A and determines that the mobile communication device 140A is served by carrier 1. Depending upon parameters of the request, e.g., a desired quality of service (QoS), the mediator gateway 150 selects a network among the networks operated by the carrier 1, e.g., either the 2G/3G RAN or the LTE RAN, to which to send the request. The mediator gateway 150 translates the request into an API request that is specific to the carrier 1 API gateway 120A. The translated request is sent to the carrier 1 API gateway 120A, and the carrier 1 API gateway 120A relays the request to the mobile communication device 140A via the selected network among the carrier 1 networks 130A.

The mobile communication device 140A replies with a response indicating its location, and the response is sent as an API response to the carrier 1 API gateway 120A via the selected network among the carrier 1 networks 130A. Based upon the parameters of the initial request, the API response is then sent to the mediator gateway 150, to be translated into a non-carrier specific API response that will be passed onto the enterprise server 110, or the API response is sent directly from the carrier 1 API gateway 120 to the enterprise server 110.

To further understand the flow of requests and responses described above, consider an illustrative example, in which the enterprise server 110 is a server for a soft drink distributor. The soft drink distributor enterprise server may send a request to the mediator gateway 150, querying the location of mobile communication device 140A. The request may include a request for preferences of the mobile communication device 140A with regard to soft drinks. Upon receipt of the request via the carrier 1 API gateway 120A and a selected network among the carrier networks 130A, the mobile communication device 140A fulfills the request and sends a reply indicating its location and soft drink preferences of a user of the mobile communication device. The reply is received by the soft drink distributor enterprise server, either via the carrier 1 API gateway 120A or via a combination of the carrier 1 API 120A gateway and the mediator gateway 150. The soft drink distributor enterprise server may then issue a request to vending machines that are associated with the soft drink distributor and are within proximity of the mobile communication device 140A to prepare to have the soft drinks preferred by the user of the mobile communication device 140 ready for purchase. The request is relayed to the vending machine in a manner similar to the way in which the initial request is relayed to the mobile communication device 140A. The mediator gateway 150 makes it possible for the soft drink distributor enterprise server to issue only one request to the vending machine and to the mobile communication device 140A, though there may be vending machines associated with the soft drink distributor that are associated with different carriers.

As noted above, the mediator gateway 150 keeps track of the status of the carrier networks 130A and 130B. According to an illustrative embodiment, the mediator gateway 150 may simulate a network if the mobile communication device for which application services are to be provided is out of coverage, e.g., because of a dead cell, or if the mobile communication device cannot be reached, e.g., because of a dead battery in the mobile communication device. For example, if a request for providing application services associated with a mobile communication device is received, but the mobile communication device is out of coverage or cannot be reached, the mediator gateway 150 may "keep the conversation going" with the enterprise server 110 in accordance with pre-defined rules and profiles. In other words, the mediator gateway 150 is a stateful machine that can simulate operations for the carrier networks 130A and 130B and the carrier API gateways 120 and 120B, if needed. For example, if the application service to be provided is a location based service, the mediator gateway 150 may predict a location of the mobile excommunication device for providing the location based services based, e.g., on a last reported location of the mobile communication device or the location of a last event associated with the mobile communication device.

The mediator gateway 150 may also take a number of predefined set of user actions if a mobile communication device is out of coverage. The mobile communication device user may opt-in and opt-out of a service that would allow the mediator gateway 150 to take certain actions. For example, a mobile communication device may opt out of allowing an enterprise server 110 to provide application services if the location of the mobile communication device is not known.

According to an illustrative embodiment, the mediator gateway 150 also interfaces with virtual desktop interface (VDI) servers and integrates carrier API services. This is useful for a case in which a mobile communication device does not have a particular application which the enterprise server 150 can send requests to and receive responses from. In this case, the mobile communication device may have an "image" of the application service provide by the enterprise server. The mobile communication device acts as a client of a VDI server for this application service, and the VDI server handles requests for the application service and provides responses on behalf of the mobile communication device. The mediator gateway 150 recognizes that the mobile communication device does not have the application but rather is a client of the VDI server. The mediator gateway 150 may store and provide a parallel virtual image of all mobile communication device data transmissions to other web servers or applications residing on the Internet 115 or at the enterprise server 110. This is made possible because the mediator gateway 150 maintains a real-time virtual image of all the data that are being transmitted to and received from the mobile communication device. This enables a mobile communication device to have several VDI sessions with multiple servers (and potentially multiple enterprise servers) at the same time, thus creating a truly mobile virtual environment.

According to another illustrative embodiment, the mediator gateway 150 may accelerate network performance. For example, if a mobile communication device operates in a slow network, the mediator gateway 150 may enhance data transmission speed by using data compression and other techniques to accelerate network performance.

According to another illustrative embodiment, the mediator gateway 150 provides a point of presence in the network, such that mediator gateways communicating via the Internet 115 worldwide can access and provision users of mobile communication devices. The mediator gateway 150 may also act as a carrier core network element single-point-of presence that handles provisioning of mobile communication devices for a plurality of different carriers.

According to another illustrative embodiment, the mediator gateway 150 provides enhanced authentication services for mobile communication devices. For example, the mediator gateway 150 may be able to authenticate a mobile communication device if the device is out of coverage for a certain amount of time. This may be facilitated by the mediator gateway 150 performing a "velocity check". As illustrative example, consider a scenario in which a mobile communication device is used to purchase a soft drink from a vending machine. Information may be received from a first vending machine at a first location indicating that the mobile communication device was used to purchase a soft drink from the first vending machine. Then, information may be received from a second vending machine at a second location, one thousand miles away from the first location, indicating that the same mobile communication device was used to purchase a soft drink from the second vending machine forty-five minutes after the purchase from the first vending machine. As it would not be possible for the mobile communication device to be at the first location and travel to the second location that is one thousand miles away in forty-five minutes, the mediator gateway 150 can determine that there is fraud, without having to know the particular of the location of the mobile communication device. The mediator gateway 150 may then provide a fraud alert to, e.g., to a carrier operator providing cellular service to the mobile communication device and/or to the enterprise server with which the vending machine is associated.

According to another illustrative embodiment, the mediator gateway 150 provides enhanced encrypted service to mobile communication devices. For the purpose, the mediator gateway 150 may maintain a database for API services that include encryption, carrier selection, network service selection, quality of service, etc. Carriers already provide authentication and encryption based on the location of the device. The mediator gateway 150 may provide enhanced encryption, e.g., symmetric or asymmetric, public key, virtual private network, etc. The determination as to which encryption method to use may be based upon provisioning parameters. These parameters may be determined when linkages to the carrier API gateways 120A and 120B are initially provisioned, such that the mediator gateway 150 provides encryption according to the carrier API gateway with which it communicates.

As an illustrative example, consider again the scenario involving a vending machine. A mobile communication device may include an application which a user of the mobile commination device may use to report a bad experience with a soft drink. This information may be reported to the enterprise server 110, e.g., a server of a soft drink distributor. The enterprise server of the soft drink distributor may query the location of the mobile communication device via the mediator gateway 150. When the location of the mobile communication device is reported to the enterprise server of the soft drink distributor via, e.g., the mediator gateway 150, the enterprise server of the soft drink distributor may then send a request to provide a coupon to the mobile communication device. The mediator gateway 150 receives this request and then sends the coupon to the mobile communication device via a selected carrier network and carrier API gateway. The mediator gateway 150 may provide apply encryption to the coupon, in addition to that provided by the carrier.

Although the description above is directed to providing application services to mobile communication devices 140A, 140B, 140C, 140D, it should be appreciated that the embodiments may be applicable to any environment in which an enterprise seeks to provide application services to entities that are capable of communicating via, e.g., the Internet 115. For example, consider an airline that has an enterprise server and plane manufacturing entities that are equipped with API gateways. Each of the manufacturing entities may be involved with manufacturing different parts of a plane. The airline may have ordered a new plane and may want to know the status of production. Rather than having to send queries to each of the different manufacturing entities, the airline may send one query to the mediator gateway 150. The mediator may translate the query into appropriate queries for each of the multiple manufacturing entities and may send the translated queries to the manufacturing entities via their respective API gateways, which may be similar to carrier API gateways 120A and 120B. The manufacturing entities may respond with the status of the parts that each of the entities are producing via the respective API gateway, which may be similar to the carrier API gateways 120A and 120B, and the mediator gateway 150 may then send this response back to the enterprise server of the airline.

FIG. 3 is a block diagram of a computing device 300 with which the mediator for API gateways 150 shown in FIG. 2 may be implemented. Although no connections are shown between the components illustrated in FIG. 3, those skilled in the art will appreciate that the components can interact with each other via any suitable connections to carry out device functions.

It should be understood that FIG. 3 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer-readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the components shown in FIG. 3, excluding propagating signals.

FIG. 3 is a block diagram of a computing device 300 with which the mediator gateway 150 shown in FIG. 2 may be implemented. According to an illustrative embodiment, the computing device 300 may be implemented in any suitable computing device having a connection to enterprise servers, such as the enterprise server 110, and carrier API gateways, e.g., the carrier API gateways 120A and 120B, via any suitable network(s). For example, the computing device 300 may be implemented as a server in communication with the enterprise server 110 and the carrier API gateways 120A and 120B over, e.g., the Internet 115.

Referring to FIG. 3, the computing device 300 includes a processor 310 that receives requests from an enterprise server 110 for providing application services, transmits a translated request to the carrier API gateways 120A and 120B, receives a response from the carrier API gateways 120A and 120B, and sends a translated response to the enterprise server 110 via the I/O data ports 320. The I/O Data Ports 320 can be implemented with, e.g., an interface including an antenna or other suitable type of transceiver through which data and signals may be transmitted and received wired and/or wirelessly.

The computing device 300 also includes a physical hard drive 380. The processor 310 communicates with the memory 330 and the hard drive 380 via, e.g., an address/data bus (not shown). The processor 310 can be any commercially available or custom microprocessor. The memory is 330 is representative of the overall hierarchy of memory devices containing the software and data used to implement the functionality of the device 300. The memory 330 can include, but is not limited to the types of memory devices described above. As shown in FIG. 3, the memory 330 may include several categories of software and data used in the device 300, including applications 340, a database 350, an operating system (OS) 360, and input/output (I/O) device drivers 370.

The I/O device drivers 370 may include various routines accessed through at least one of the OS 360 by the applications 340 to communicate with devices and certain memory components.

The applications 340 can be stored in the memory 330 and/or in a firmware (not shown) as executable instructions, and can be executed by the processor 310. The applications 340 include various programs that implement the various features of the device 300. For example, the applications 340 may include applications for receiving requests for providing application services from an enterprise server, determining a carrier serving a mobile communication device associated with the request, selecting a network associated with the carrier, translating the request, and sending the request as described above. The applications may also include applications for receiving a response, translating the response, and sending the response as described above.

The database 350 represents the static and dynamic data used by the applications 340, the OS 360, the I/O device drivers 370 and other software programs that may reside in the memory. The database may 350 may be used to store, e.g., information regarding the locations of mobile communication devices, the status of networks, carriers associated with mobile communication devices, etc.

While the memory 330 is illustrated as residing proximate the processor 310, it should be understood that at least a portion of the memory 330 can be a remotely accessed storage system, for example, another server in communication with the processor 310 via the Internet 115, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

Although details of the carrier API gateways 120A and 120B are not illustrated, it should be appreciated that a carrier API gateway may be implemented with a computing device having features similar to those illustrated and described with reference to FIG. 3. In particular, a computing device within a carrier API gateway may comprise a memory including applications for performing various processes described above. The computing device in the carrier API gateway may also include a processor for executing such applications.

Similarly, although details of an enterprise server 110 are not illustrated, it should be appreciated that an enterprise server 110 may be implemented with a computing device having features similar to those illustrated and described with reference to FIG. 3. In particular, a computing device within the enterprise server 110 may comprise a memory including applications for performing various processes described above. The computing device in the enterprise server 110 may also include a processor for executing such applications.

Figure 4:
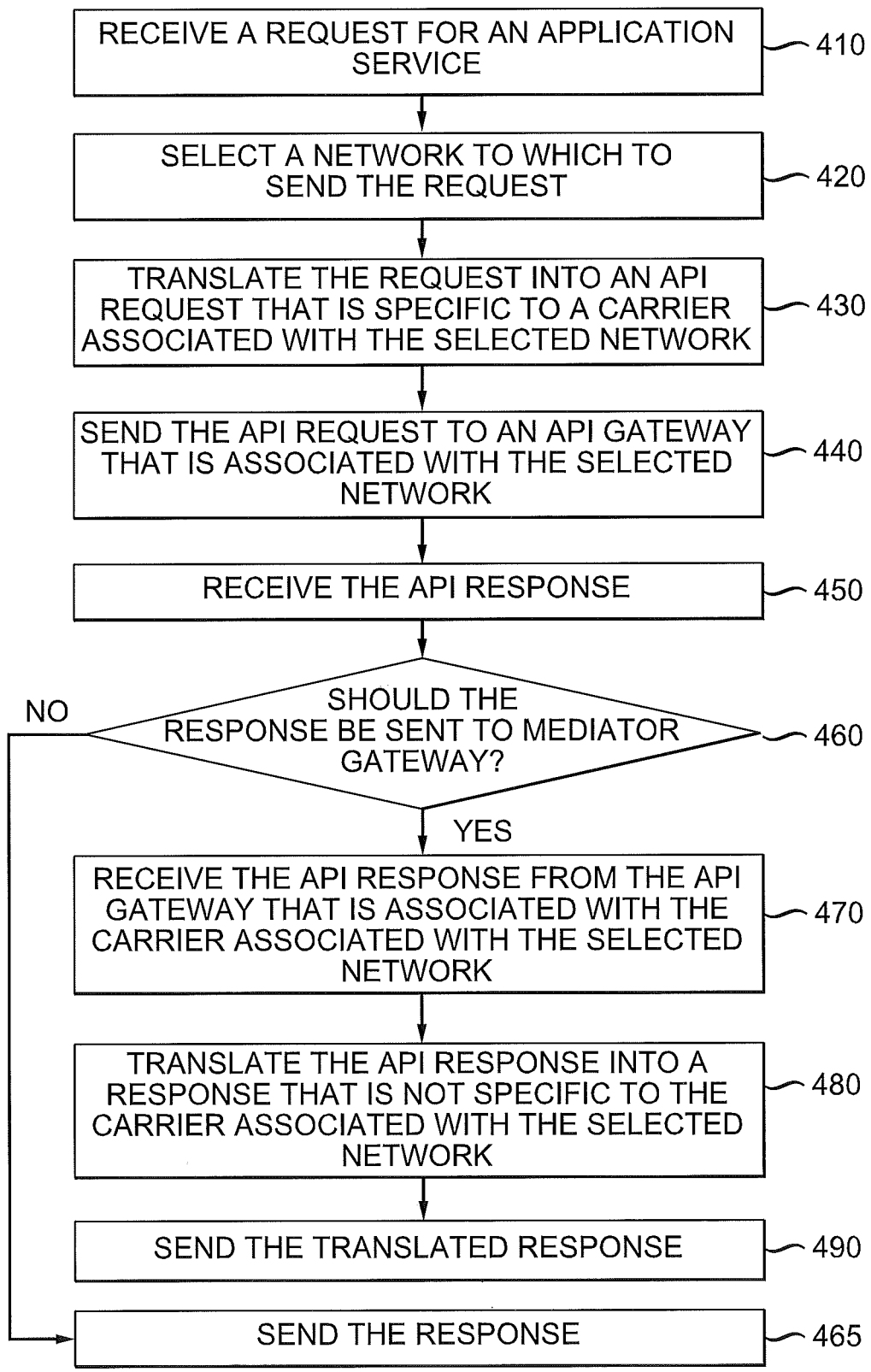
FIG. 4 illustrates a method for providing application services according to illustrative embodiments.

FIG. 4 illustrates a method for providing application services according to illustrative embodiments. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 4, the method beings at step 410, at which a request for providing an application service associated with a mobile communication device, such as mobile communication devices 140A, 140B, 140C and 140D, is received, e.g., by the mediator gateway 150. The request is received, e.g., from the enterprise server 110. At step 420, the mediator gateway 150 selects a network among the plurality of networks, associated with different carriers, e.g., carrier 1 networks 120A and carrier 2 networks 120B to which to send the request. Although not illustrated, this step may be performed after determining which carrier serves the mobile communication device with which the request is associated. At step 430, the mediator gateway 150 request is translated into an API request that is specific to the carrier associated with the selected network. At step 440, the mediator gateway sends the API request to a carrier API gateway associated with the carrier that is associated with the selected network.

At step 450, a response is received that is associated with the mobile communication device, such as mobile communication devices 140A, 140B, 140C, 140D. At step 460, a determination is made whether the API response should be sent to the mediator gateway 150 or directly to the enterprise server 110. This determination may be made in advance by the mediator gateway 150 as described above.

If it is determined that the API response should not be sent to the mediator gateway 150, then at step 465, the response is sent directly to the enterprise server 110, bypassing the mediator gateway 150. If it is determined at step 460 that the API response should be sent to the mediator gateway 150, then at step 470, the mediator gateway 150 receives the response from the carrier API gateway that is associated with the carrier that is associated with the selected network. At step 480, the mediator gateway 150 translates the API response into a response that is not specific to the carrier that is associated with the selected network. At step 490, the translated response is sent to the enterprise server 110.

According to illustrative embodiments, the mediator gateway 150 offers several advantages. For example, use of the mediator gateway 150 results in a significant reduction in constituent mobile carrier hardware, software, and system customization and maintenance efforts. The mediator gateway 150 also results in improved accessibility of a plurality of mobile communication devices and applications across heterogeneous mobility carrier operating runtime platforms and environments, The mediator gateway 150 provide provides improvements in quality of service for mobile communication device users and allows for connected application persistence and throughput, resulting in a general improvement in mobile communication device user experience. The mediator gateway 150 may also provide significant capital and operating expenditure savings for enterprises and carriers, which benefit individual mobile communication device users in terms of lowering subscription plan rates.

The law does not require and it is economically prohibitive to illustrate and teach every possible embodiment of the present claims. Hence, the above-described embodiments are merely illustrative illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A mediator gateway device, comprising:
   a processor; and
   a memory that stores executable instructions that, when executed by the processor, facilitate performance of operations comprising:
      receiving, from an enterprise server device, request data representing a request for providing an application service, wherein the request is associated with a mobile communication device, wherein the mediator gateway device couples the enterprise server device to gateway devices of networks that employ different cellular technologies and are associated with different cellular carrier identities;
      storing network status data indicative of respective network statuses for the networks, wherein a network status of the network statuses is employable to determine a performance characteristic of network devices of a network of the networks;
      based on the network status data, selecting a gateway device of the gateway devices via which the request data is to be sent to the mobile communication device; and
      based on defined rule data, selecting a route via which response data representing a response to the request is to be sent from the mobile communication device to the enterprise server device, wherein the selecting comprises selecting the route prior to receiving the response data and wherein the route is selected from a first route via the mediator gateway device and a second route that bypasses the mediator gateway device.

2. The mediator gateway device of claim 1, wherein the gateway device is a first gateway device that provides a first performance to fulfill the request that is determined to be better than a second performance to fulfill the request that is provided by a second gateway device of the networks.

3. The mediator gateway device of claim 1, wherein the operations further comprise:
   in response to the first route being selected, receiving the response data, wherein the response data is received via the gateway device and wherein the gateway device comprises an application programming interface gateway device associated with a cellular carrier identity of the different cellular carrier identities and the response data comprises an application programming interface response that is specific to the cellular carrier identity.

4. The mediator gateway device of claim 3, wherein the operations further comprise:
   determining translated response data that is not specific to the cellular carrier identity based on translating the response data; and
   sending the translated response data to the enterprise server device.

5. The mediator gateway device of claim 1, wherein the request data comprises parameter data indicative of a security parameter and the selecting comprises selecting the route based on the parameter data.

6. The mediator gateway device of claim 1, wherein the response data is first response data and the operations further comprise:
   in response to determining that the mobile communication device is out of a coverage area associated with a network device coupled to the gateway device, determining, based on defined profile data associated with the mobile communication device, second response data that is to be provided to the enterprise server device.

7. The mediator gateway device of claim 1, wherein the response data is first response data and the operations further comprise:
in response to determining that the mobile communication device cannot be contacted, determining, based on defined profile data associated with the mobile communication device, second response data that is to be provided to the enterprise server device.

8. A method, comprising:
coupling, by a mediator gateway device comprising a processor, an enterprise server device, associated with an application service, to gateway devices of networks that employ different cellular technologies and are operated by different cellular carriers having respective cellular carrier identities;
storing, by the mediator gateway device, network status data indicative of respective network statuses for the networks, wherein a network status of the network statuses represents a performance characteristic of network devices of a network of the networks;
in response to receiving, from the enterprise server device, request data representing a request for providing the application service to a mobile communication device and based on the network status data, selecting, by the mediator gateway device, a gateway device of the networks via which the request data is to be sent to the mobile communication device; and
based on defined rule data, determining, by the mediator gateway device, route data indicative of a route via which response data representing a response to the request is to be sent from the mobile communication device to the enterprise server device, wherein the determining comprises selecting the route prior to receiving the response data and selecting the route from a first route via the mediator gateway device and a second route that bypasses the mediator gateway device.

9. The method of claim 8, further comprising:
facilitating, by the mediator gateway device, a transmission of the request data to the mobile communication device via the gateway device.

10. The method of claim 9, further comprising:
enhancing, by the mediator gateway device, the transmission based on a compression of the request data.

11. The method of claim 10, further comprising:
in response to determining that the first route has been selected, receiving, by the mediator gateway device, the response data from the gateway device and translating the response data into translated response data that is not specific to a cellular carrier identity of the cellular carrier identities that is associated with the gateway device; and
directing the translated response data to the enterprise server device.

12. The method of claim 8, wherein the request data comprises parameter data indicative of a security parameter and the determining the route comprises determining the route based on the parameter data.

13. The method of claim 8, wherein the response data is first response data and the method further comprises:
in response to determining that the mobile communication device is not coupled to the gateway device and based on defined profile data associated with the mobile communication device, determining, by the mediator gateway device, second response data that is to be directed to the enterprise server device.

14. The method of claim 8, wherein the response data is first response data and the method further comprises:
in response to determining that the mobile communication device cannot be contacted and based on defined profile data associated with the mobile communication device, determining, by the mediator gateway device, second response data that is to be directed to the enterprise server device.

15. A non-transitory machine-readable storage medium comprising executable instructions that, when executed by a processor of a first gateway device, facilitate performance of operations comprising:
in response to receiving, from an enterprise server device, request data indicative of a request for providing an application service that is associated with a user equipment, determining a cellular carrier identity of a cellular carrier network that serves the user equipment, wherein the first gateway device couples the enterprise server device to second gateway devices of different cellular networks that employ different cellular technologies, wherein the different cellular networks comprise the cellular carrier network;
storing network status information indicative of respective performance characteristics of the different cellular networks;
based on selecting, in accordance with network status information, a gateway device of the second gateway devices, facilitating a transmission of the request data to the user equipment via the gateway device; and
prior to receiving, from the user equipment, response data representing a response to the request and based on defined rule data, determining route data indicative of a route selected from a first route that routes the response data to the enterprise server device via the first gateway device and a second route that bypasses the first gateway device while routing the response data to the enterprise server device.

16. The non-transitory machine-readable storage medium of claim 15, wherein the operations further comprise:
in response to determining that the route data is indicative of the first route, receiving the response data from the user equipment via the gateway device, and wherein the response data represents an application programming interface response that is specific to the cellular carrier identity.

17. The non-transitory machine-readable storage medium of claim 16, wherein the operations further comprise:
translating the response data into translated response data that is not specific to the cellular carrier identity; and
providing the translated response data to the enterprise server device.

18. The non-transitory machine-readable storage medium of claim 15, wherein the request is a location-based service request and the operations further comprise:
in response to determining that the mobile communication device is out of a coverage area associated with the gateway device, determining location data indicative of a last known geographical location of the user equipment; and
providing the location data to the enterprise server device.

19. The non-transitory machine-readable storage medium of claim 15, wherein the request is a location-based service request and the operations further comprise:
in response to determining that the mobile communication device is out of a coverage area associated with the network device, determining location data indicative of a last known geographical location of an event associated with the user equipment; and providing the location data to the enterprise server device.

20. The non-transitory machine-readable storage medium of claim 18, wherein the providing the location data comprises providing the location data to the enterprise server device in response to determining that authorization information has been received from the user equipment.

* * * * *